United States Patent Office 3,254,149
Patented May 31, 1966

3,254,149
VACUUM MELTING OF METALS
Donald E. Cooper, Las Vegas, Nev., assignor to Titanium Metals Corporation of America, New York, N.Y., a corporation of Delaware
No Drawing. Filed May 10, 1965, Ser. No. 454,638
7 Claims. (Cl. 13—34)

This is a continuation-in-part of my application Serial No. 217,524, filed August 17, 1962.

This invention relates to vacuum melting of metals and more particularly to arc melting such metals and more particularly to arc melting such metals as consumable electrodes employing three-phase alternating electric current as melting power.

Direct current has heretofore been most generally used as melting power in consumable electrode arc furnaces. A direct current arc is relatively stable and once started can be maintained without difficulty over a long melting period. One factor affecting the stability of an arc is the pressure of the atmosphere in the melting zone. It is known that below a critical minimum pressure the arc produced by direct current will tend to become unstable or may convert to an undesirable glow discharge.

Melting by use of alternating current is, however, more difficult because the arc is inherently less stable. An existing arc can often be maintained under conditions which would make it difficult to initially start it. When using alternating current, however, the voltage increases and decreases cyclically and in effect causes a repetitious extinguishing and restriking the arc. Also, every time the voltage changes, it changes the polarity of the electrodes and sets up new conditions for arc discharge.

Employment of alternating current as a power source has advantages over direct current since commercial power is transmitted as alternating current and this may readily be converted by means of a transformer to the desired voltage, whereas to obtain direct current, the alternating current supply must be rectified often at considerable cost for necessary equipment and its operation and maintenance.

A further deterrent to previous use of alternating current for such purpose is the fact that many metals are purified during melting, and this requires extremely low pressures in melting furnaces generally of the order of less than a millimeter of mercury absolute and often lower than 100 microns. Such extremely low pressures have further complicated the problem of maintaining a stable arc with alternating current.

It is the principal object of this invention to provide an improved method for melting consumable electrodes of metal in an arc furnace employing alternating current for melting power. Another object of this invention is to provide a method for melting consumable electrodes of metal under conditions providing improved arc stability employing alternating current for melting power. A further object of this invention is to provide an improved and economical method for melting consumable electrodes of metal in an arc furnace. These and other objects of this invention will be apparent from the following description thereof.

This invention in its broad aspects contemplates improving arc stability during melting consumable electrodes of metal using alternating current by employing a trio of such electrodes and connecting each such electrode to one phase of a source of three-phase alternating current. The electrodes are each to be of at least a critical minimum diameter and the alternating current is to be supplied to such electrodes at amperage to provide at least a critical minimum current based on the diameter of such electrodes. The furnace in which such electrodes are melted is to be evacuated to a pressure below 1 millimeter of mercury absolute and preferably below 100 microns.

Plasma must be present in any electrical discharge and comprises the discharge particles that transport the electrical current between the electrodes. It is composed, so far as is known, of electrons and ions which form a path for the current flow. Once an arc is initiated or struck between electrodes, it can become self-sustaining when the heat of the arc ionizes the atmosphere between the electrodes to provide and maintain the necessary plasma on which the arc depends. In the case of arc melting in air or under a substantial pressure (above absolute) of any gas, arc stability causes a few problems because of the ample quantity of such gas in the melting zone. Even the so-called inert gases such as helium and argon will be ionized by the arc temperature to form sufficient plasma for continuous arc stability when present in the melting zone atmosphere at pressures of a millimeter or more of mercury absolute. When, however, high vacuum is employed in a melting furnace, lack of plasma forming atmosphere creates a tendency toward poor arc stability. At extremely low pressures, it has been observed that it may be impossible to maintain an arc.

It is to be understood that an alternating current arc may not be continuous as is a direct current arc, but when it follows the voltage change cycles smoothly, dying out as the voltage passes through zero and promptly restriking when the voltage increases again, it is considered stable as this term is herein employed.

The materials of which the electrodes are composed also affect the plasma formed and the arc stability. Under high vacuum while the furnace atmosphere may not contribute materially to plasma formation, the materials of the electrodes themselves may partially volatilize, or certain components or constituents may volatilize to form a gaseous medium between the electrodes which can be ionized to form an arc-carrying plasma. This accounts for the known fact that certain metals when employed as consumable electrodes in an arc melting furnace are much more difficult to melt, that is, the arc between the electrodes is less stable than when melting other metals. The characteristics of metals contributing to plasma formation are though to include their vapor pressure at arc temperature and also their ionization potential. Precise criteria, however, have not yet been fully determined and the effectiveness of metals employed in consumable electrode arc melting can generally only be classified relatively based on known factors and experimental experience.

The type of electric current employed to strike and maintain an arc also affects arc stability. A direct current arc is inherently more stable than an alternating current arc because the heat of the arc generates plasma for its own continuation. Use of alternating current, however, involves cyclic dying out and restriking of the arc each time the current voltages passes through zero and changes polarity. Thus, the plasma generation is not continuous as in a direct current arc and sufficient plasma must be maintained between the electrodes during periods when the arc is extinguished in order that the arc may readily restrike itself when the potential again reaches arc forming intensity.

High vacuum in the furnace affects operation with an alternating current arc. It results in an accelerated tendency for plasma generated during arcing to dissipate more rapidly when the arc is extinguished. Plasma generated in the melting zone by volatilization of electrode constituents is essentially local, and an extremely low total pressure in the rest of the furnace chamber will cause rapid dissipation and diffusion of gases and plasma components from the immediate arc area.

The process of this invention contemplates melting under pressure in the furnace of less than 1 millimeter of mercury absolute. Therefore, the furnace atmosphere can contribute little to plasma generation and arc striking and restriking, and maintenance of stability must rely principally on plasma generated from other sources and a most careful conservation of plasma generated from whatever source in order to insure its retention in the melting zone.

Metals melted by consumable electrode arc melting are principally the refractory metals including columbium, cobalt, iron, molybdenum, nickel, tantalum, titanium, vanadium, tungsten, and zirconium, as well as alloys of which these elements are present in combination, or alloys of which these elements form the base and which include other alloying elements, including steel, stainless steel, and the so-called super alloys. In addition, metals other than the so-called refractory metals may also be so melted if desired for reasons of purity, convenience, availability of power and equipment, etc. These metals vary considerably in their plasma generating capacity. In the case of alloys, this capacity may be appreciably different from that of the base metal.

The plasma generating capacity of metallic elements and various alloys can be classified based on their ionization and plasma forming characteristics at elevated temperature. Table 1 below shows a list of such elements together with "P," their corresponding plasma generating capacities. The "P" values in Table 1 have been arranged and calculated so that they indicate the order of magnitude of relative plasma generating capacity for each element. For example, the plasma generating capacity of aluminum ("$P$"=5.08) is about five times that of beryllium ("$P$"=.966). Metals listed in Table 1, and alloys formed as combinations of such metals, are suitable for melting according to this invention.

TABLE 1

| Element: | P (plasma generating capacities) |
|---|---|
| Be | .966 |
| Te | 1.13 |
| Sb | 1.43 |
| B | 1.62 |
| Si | 1.72 |
| W | 1.74 |
| Fe | 2.00 |
| Co | 2.02 |
| Cu | 2.15 |
| Ni | 2.24 |
| Mg | 2.24 |
| Mn | 2.47 |
| Mo | 2.55 |
| Sn | 2.60 |
| Zr | 3.14 |
| Ti | 3.34 |
| Cr | 3.44 |
| Cb | 3.47 |
| V | 3.51 |
| Ta | 4.98 |
| Al | 5.08 |

Table 1, above, is the Table 1 referred to, and included by such reference, in the claims appended hereto.

As explained hereinbefore, a certain critical minimum electrode diameter is necessary for proper operation of the melting process according to this invention. The minimum electrode diameter is dependent on the plasma generating capacity of the metal of the electrode and is determined for a pure, that is, unalloyed metal, according to the following equation (a) $$D = 12.13 - 1.93P$$

wherein "$D$" is the electrode diameter in inches and "$P$" is the plasma generating capacity shown for such metal in Table 1.

When melting an alloy of metals selected from the group listed in Table 1, the plasma generating capacity "$P$" is determined as the average of the "$P$" values of each of its constituent metallic elements present in significant amounts. Thus, when melting, for example, pure zirconium, the plasma generating capacity "$P$" is 3.14 taken directly from Table 1, and this value is substituted in Equation $a$ to determine the minimum electrode diameter. When melting, for example, an alloy consisting of 0.6% manganese and balance iron (with non-metallics such as P and S not considered) the "$P$" value for manganese is 2.47 and for iron 2.00, and the average would give an alloy "$P$" value of 2.24. It will be apparent that the "$P$" value for alloys will depend on the constituent metals present. Alloy steels of commercial interest will most often show a "$P$" value of over 2 and up to 3, while popular titanium base alloys will most often show a "$P$" value of over 3 and up to 4. The "$P$" value is then used in Equation $a$ to determine the minimum electrode diameter for alloy electrodes in the same manner as if it were an unalloyed metal.

The reason for the effect resulting in the empirical equation for determining plasma generating capacity of alloys is not precisely known. From my work, it appears that the plasma generating capacity of alloys is not proportional to the amounts of the constituent elements present nor do considerations based on vapor pressure, partial pressures or the application of Raoult's law, appear to be significant. It may be that volatilization of alloy metal in the arc occurs as a result of very local areas or spots of temperature high enough to completely vaporize all the alloy constituents in such areas or spots. With the total vaporization of small portions of the metal, a gas is formed which is partially ionized to produce current carrying plasma. But the resulting plasma seems to be the result of the influence principally of the presence of certain vaporized metals in the gas and not their proportions. I have found that the presence of minute quantities of constituents, particularly of high plasma generating capacity, affect the plasma produced and the arc stability as much as greater quantities. For this reason, the effective plasma generating capacity of an alloy "$P$" can be taken as the simple mathematical average of the capacities "$P$" of the individual constituent metallic elements. The elements included in this average may be present in small percentages, but the amounts must be significant and mere traces appear not to be effective. For practical purposes, a significant amount is considered to be about 0.1% or more.

A critical minimum amount of electric current should be supplied to each electrode as hereinbefore described, and this amount of current is preferably at least 1200 amperes per inch of equivalent circular electrode diameter. When the electrodes are of circular cross sections, the equivalent circular diameter is, of course, the diameter of the cross section circle. When the electrodes are of cross section other than circular, such as sector shaped, the circular diameter is taken as that of a circle equivalent in cross sectional area to the particular cross section of the actual electrode. Thus, for example, a sector-shaped electrode of cross sectional area of 102 square inches would be considered to have an equivalent circular diameter of 11.4 inches, since this would be the diameter of a circle of area 102 square inches. This relationship will hold for cross section shapes which are reasonably regular, such as circles, squares, section rectangles and other shapes having a ratio of actual maximum diameter or dimension across, to actual minimum diameter of not more than 2 to 1.

The minimum amount of current specified above, that is at least 1200 amperes per inch of individual electrode diameter, is preferred for use in commercial furnaces operated for high production rate. It is to be understood that the 1200 ampere minimum is safely above current conditions which might produce arc instability. Under certain conditions, however, it may be desirable to employ a smaller amount of current in relation to electrode diameter, and this may occur when melting certain metals or for special operations requiring a lower melting rate. I have also found that the minimum current per inch of electrode diameter may be below the 1200 ampere preferred safe minimum, and that the amount of current below which arc instability will seriously interfere with melting operations is related to the plasma generating capacity "P" of the metal or alloy being melted.

Specifically, the minimum current per inch of electrode diameter for metals or alloys having a "P" value of up to 2 it is 1200 amperes, for metals or alloys having a "P" value above 2 and up to 3 it is 1100 amperes, for metals and alloys having a "P" value above 3 and up to 4 it is 700 amperes, and for metals and alloys having a "P" value above 4 the minimum current per inch of electrode diameter is 500 amperes.

It may be found that the current flowing to the electrodes may vary slightly as between each of the electrodes. Although arranged apparently in a uniform hook-up, one electrode may be found to carry somewhat more or less current than the other two, or each of the three electrodes may show slightly different current readings. To apply the minimum current as directed herein, the electrode showing the lowest current per inch of electrode diameter should be considered for control of the amount of current to insure arc stability.

The voltage employed measured across the arc is generally not critical and may vary between 20 and 80 volts, which is of the same order of magnitude as that preferred for D.C. arc melting. The voltage drop across the arc will vary considerably during the melting operation as will the current to some extent as in D.C. melting, depending largely on the spacing between the electrode bottom ends and the pool of molten metal in the mold or crucible which spacing determines the arc length.

Evacuation of the furnace during melting, according to this invention, is carried out to reduce the pressure therein to below 1 millimeter of mercury absolute. This is measured by communicating connection to the furnace interior or adjacent vacuum piping of a commercial vacuum gauge suitable for determining such pressures. A McLeod gauge is useful and adequate for the purpose, and furnace pressures mentioned herein are intended to be as determined by such a gauge. Other gauges or installations operating on different principles may need reading correction to produce comparative determination, as is well known to the art.

Operation below 100 microns pressure may be preferred to produce metal of greater purity and is contemplated according to this invention. The arc under such pressure condition may be slightly less stable than when operated at higher pressure but will be sufficiently stable to produce efficient, smooth melting conditions when, of course, the electrode diameters and power are within the limits herein defined.

It is generally more difficult to initiate an A.C. arc than to maintain it after it has been started. Therefore, small bodies of metal of the same composition as the electrodes may be placed on a striker plate in the bottom of the crucible to provide small, readily melted areas to initiate plasma formation. Additionally, to aid in plasma formation at the start, some readily volatilized and highly ionizable salt such as potassium chloride may also be placed on the striker plate or fed to the arc zone. The KCl so added is dissipated very quickly after the arc is initiated and does not affect melting conditions thereafter, that is, during the actual melting period. It is an important feature of this invention, however, that a smooth, stable arc may be maintained during the melting period after arc initiation without the need for additions or artificial arc supporters.

The following examples will illustrate embodiments of the practice of this invention:

*Example 1*

An enclosed furnace containing a 28-inch internal diameter water-cooled copper crucible is employed. Electrode driving mechanism is arranged at the top of the furnace to drive three equally spaced, and insulated electrode drive rams, to the bottom of which the electrodes are attached in spaced relationship. The motion of the drive rams is controlled by an electrical system including an amplidyne, responsive to changes in arc voltage and current.

A vacuum pump is connected to a top portion of the furnace for evacuation of its interior and a McLeod gauge also connected to a top part of the furnace for indication of the pressure inside.

A three-phase alternating power supply is connected to the three electrode drive rams, one ram connected to each phase, to conduct the current to each of the individual electrodes attached thereto.

The metal to be melted is unalloyed titanium having a plasma generating capacity from Table 1 of 3.34. Employing Equation $a$ to determine the minimum electrode diameter:

$$D = 12.13 - 6.45 = 5.7 \text{ inches}$$

An electrode of circular cross section 8 inches in diameter is taken as above the minimum required. The minimum amperage required is determined (on the basis of 1200 amperes per inch of electrode diameter) as $$8 \times 1200 = 9600$$

amperes for each electrode. A power input to each electrode of 12,000 amperes is arranged to be safely and conveniently above the minimum required.

Three circular electrodes of 8-inch diameter and 100 inches long are attached by stubs to the drive rams. A titanium striker plate is placed in the bottom of the crucible and on top of this are placed some titanium turnings. The furnace is closed and evacuated to about 200 microns of mercury absolute indicated on the McLeod gauge.

Power is then turned on and the electrodes are lowered by the rams and driving mechanisms, until an arc is struck between the electrodes and the metal in the bottom of the crucible. Once initiated, the arc sustains itself and the arc heat melts metal from the electrodes to form an ingot in the crucible. The electrode drive ram actuating mechanism is controlled to maintain a short distance between the electrode bottoms and the pool of molten metal in the crucible to maintain a voltage drop across the arc of about 41 volts and a current flow at each electrode of average about 12,000 amperes.

The arc is self sustaining and stable to produce smooth melting conditions for a melting period of 61 minutes at which time the electrodes will have been consumed to the practical limit. At this time the power is shut off, the drive rams actuated to lift the electrode stubs to the top of the furnace and the furnace interior is flooded with helium for a short period to cool the ingot in the crucible. The furnace is then disassembled and the ingot removed.

The ingot so produced weighs 2450 pounds and is of good quality. The melting rate is determined to be 40 pounds per minute with power consumption of 0.44 kw. hour per pound. The power factor is 0.7.

*Example 2*

The same furnace and equipment described in Example 1 is employed.

The metal to be melted is a titanium alloy consisting of 6% aluminum, 4% vanadium, balance titanium. The plasma generating capacity of this alloy is determined by calculating the average of the "P" values from Table 1 for aluminum, vanadium and titanium, as follows:

Aluminum _____ 5.08
Vanadium _____ 3.51
Titanium _____ 3.34
                                              3)11.93
                                              ‾‾‾‾‾‾‾
                                               3.94 = P The value 3.94 for "P" is then used in Equation $a$ to determine the minimum electrode diameter:

$$D = 12.13 - 7.6 = 4.5 \text{ inches}$$

A sector shaped electrode of 90 inches cross section area (10¾ inch equivalent circular diameter) is taken as above the minimum required. The minimum amperage required is determined (on the basis of 1200 amperes per inch of electrode diameter) as 10.75 × 1200 = 12,900 amperes for each electrode. A current input to each electrode of 14,500 amperes is arranged with an arc voltage of about 51 volts to be safely and conveniently above the minimum required.

Three sector shaped electrodes of 90 inches cross sectional area and 100 inches long are then employed in the same furnace as described in Example 1, evacuated to a pressure of about 50 microns of mercury absolute. A striker plate and turnings of the same alloy are used for arc initiation, and once the arc is started, it remains stable during a smooth melting operation similar to that described in Example 1.

After a 77-minute melting period, power is shut off, the furnace flooded with the helium and subsequently disassembled and the ingot removed from the crucible. The ingot weighs 4380 pounds and is of good quality. The melting rate is determined to be 57 pounds per minute with power consumption of 0.46 kw. hour per pound. The power factor is 0.7.

*Example 3*

The same furnace and equipment described in Example 1 is employed.

The alloy to be melted is a high alloy steel (A-286) of the following composition:

|  | Percent |
|---|---|
| Carbon | .05 |
| Mn | 1.4 |
| Si | 0.4 |
| Cr | 15.0 |
| Ni | 26.0 |
| Mo | 1.25 |
| Ti | 2.15 |
| Al | 2.0 |
| Boron | .003 |
| V | 0.3 |
| Fe | Balance |

The "P" values from Table 1 for the Mn, Si, Cr, Ni, Mo, Ti, Al, V, and Fe are averaged to give an alloy "P" value of 2.9. This value is then used in Equation $a$ to determine the minimum electrode diameter:

$$D = 12.13 - 5.60 = 6.53 \text{ inches}$$

The minimum amperage required is determined (on the basis of 1200 amperes per inch of electrode diameter) as 7 × 1200 = 8400 amperes for each electrode. A current input to each electrode of 10,000 amperes with an arc voltage of about 35 volts is arranged to be safely and conveniently above the minimum required.

Three sector-shaped electrodes of 108 square inches cross section (equivalent circular diameter 11.4 inches) and 100 inches long are then employed in the same furnace as described in Example 1, evacuated to a pressure of about 30 microns of mercury absolute. One inch thick wafers of the same alloy, together with ¼ pound of KCl are used for arc initiation, and once the arc is started it remains stable during a smooth melting operation similar to that described in Example 1.

After a 108 minute melting period, power is shut off, the furnace flooded with helium and subsequently disassembled and the ingot removed from the crucible. The ingot weighs 3300 pounds and is of good quality. The melting rate is determined to be 1800 pounds per hour with power consumption of 0.69 kw. hour per pound. The power factor is 0.82.

Examples 1 to 3 above represent useful operating embodiments of this invention. Other metals and alloys may be melted accordingly to the principles outlined herein and suitable equipment utilized based on known engineering designs and experience. While various modifications in melting procedure and equipment may be made, use of electrodes of diameter greater than the minimum defined and the current greater than the minimum required is necessary to obtain the smooth melting and stable arc conditions when operating with three-phase alternating current under high vacuum, that is, less than 1 millimeter. For comparison with results obtained in Examples 1 to 3, ingots were melted of a low alloy steel of the following composition:

|  | Percent | "P" |
|---|---|---|
| Manganese | 0.75 | 2.47 |
| Silicon | 0.23 | 1.72 |
| Chromium | 1.05 | 3.44 |
| Nickel | 0.55 | 2.24 |
| Molybdenum | 1.00 | 2.55 |
| Vanadium | 0.97 | 3.51 |
| Iron | Balance | 2.00 |

Electrodes of circular shape, 9 inches in diameter, were employed. Three-phase current with from 9,300 to 10,500 amperes to each electrode was used. Vacuum in the furnace was 35 microns and the furnace and equipment were the same as that described in Example 1. In this test, some erratic melting conditions were encountered with arc stability being poor. At times the arc became irregular and difficult to maintain. It will be seen that while the electrode diameter was adequate (9 inches in diameter compared to 7.2 inches minimum required for "P" = 2.56), the current was below the minimum required for efficient melting according to this invention. The low current used, 9,300 amperes, equivalent to 1,033 amperes per inch of electrode diameter, is below the preferred 1,200 ampere minimum for general high output melting and also below the 1,100 ampere minimum for low current conditions based on the alloys "P" value between 2 and 3.

Another test was made using the same furnace equipment but with 6-inch diameter circular electrodes of the same low alloy steel just described. Amperage to each electrode as before was average 9,000 to 9,300 amperes. Melting effectiveness was somewhat better than obtained with the 9-inch electrodes, but arc stability caused trouble during the melt. It will be seen that while the current was above the minimum required for this size electrode, that is, 7,200 amperes, the electrode diameter was less than the minimum required, that is, 7.2 inches, determined from the plasma generating capacity of the alloy and Equation $a$. In these two tests, less than minimum current and less than minimum electrode diameter respectively caused difficulties in melting and relatively poor arc stability.

Example 4, which follows, illustrates more specifically the effect of employment of lower amounts of current than were employed in Examples 1 to 3:

*Example 4*

Furnace equipment and general operation similar to that described for Examples 1 to 3 were employed.

The electrodes were three 10-inch diameter rounds of commercially pure titanium identified as grade 75A. These 10-inch diameter circular cross section electrodes were melted at three different power settings to provide on each of the three electrodes a low average of 8,900 amperes, 8,600 amperes, and 6,600 amperes respectively for taps identified as No. 2, No. 3, and No. 4.

From Table 1, the value of "P" for titanium metal is found to be 3.34. The minimum current for operation at low current levels is therefore 700 amperes since the "P" value of the metal being melted lies above 3 and below 4.

The melt was started on tap No. 2, providing an average of 8,900, 10,000, and 9,800 amperes respectively on each of the three electrodes. Under this condition of power input, melting was smooth and the arc was stable. After a period of operation under these conditions, power was shut off momentarily and connection to tap No. 3 was made, which provided current of 8,600, 9,200, and 9,100 to each of the three electrodes. Operation at this power level was satisfactory, with melting progressing smoothly and the arc stable. After a period of operation power was again shut off and changed to tap No. 4, which provided 6,000, 7,000, and 7,200 amperes on each of the three electrodes. Under these conditions, the amperage was too low to provide sufficient current to maintain a stable arc. Instability was demonstrated by irregular operation of the automatic controls, continual motion of the ammeter and volt meter pointers, and by alternate pumping action of the electrode rams, which kept the rams and cables in cyclic motion. The top of the ingot produced by melting at tap No. 4 was seen to show a clover leaf shaped pool outlining the size and shape of the electrodes, indicating sufficient power only to keep a minimum sized pool molten.

It will be noted that operation with power taps No. 2 and No. 3 is above the 700 ampere per diameter inch minimum, and operation on tap No. 4 with one electrode at 6,600 amperes is below the minimum 700 ampere per diameter inch required for stable arc operation.

The maximum electrode diameter useful in the practice of this invention is governed by considerations of weight, size, and usefulness in further processing. Ordinarily about 36 inches diameter (including this diameter circle and the equivalent in other shapes as defined) would be considered a workable maximum for a circular ingot since three electrodes of this size would produce an ingot somewhat larger than 60 inches in diameter. For production of ingot shapes other than circular, some increase in this size may be desirable.

In like manner, the maximum electric current fed to the electrodes may be limited by practical operating conditions. As will be understood by those skilled in the art, the electrode must be capable of conducting the current applied from its connection to the drive ram to its bottom where arcing and melting take place. Metals will vary considerably in their electrical conductivity, but any of those listed will be capable of carrying a number of times the minimum of 1200 amperes per diameter inch applied to electrodes larger than the minimum diameter specified. It will be appreciated that as the diameter gets larger the ratio of area to minimum current gets larger, since the current requirements according to this invention are based on electrode diameter. The power supply, furnace construction and electrical design will properly be integrated with the size of electrodes and melting rate desired, and the latter will be most dependent on the electrical current input.

I claim:
1. In a method for arc melting consumable electrodes of a metal selected from the group consisting of Be, Te, Sb, B, Si, W, Fe, Co, Cu, Ni, Mg, Mn, Mo, Sn, Zr, Ti, Cr, Cb, V, Ta, and Al, and alloys formed as combinations of such metals the improvements which comprise:
(a) employing said metal in the form of a trio of consumable electrodes, and melting said electrodes to form an ingot in an arc furnace evacuated to a pressure below one millimeter of mercury absolute;
(b) supplying three-phase alternating electric current as melting power with each phase of said current being connected to one of said trio of electrodes;
(c) the equivalent circular diameter of each of said electrodes of said metal being a minimum determined from the equation

$$D = 12.13 - 1.93P$$

wherein "D" is the electrode equivalent circular diameter in inches, and "P" is the plasma generating capacity of said metal which for unalloyed metal is the "P" value shown for such metal in Table 1, and "P" for alloys is the average of the values for "P" shown in Table 1 for each constituent metal of said alloy present in significant amounts; and,
(d) the electric current supplied to each of said electrodes being a minimum for each inch of equivalent circular diameter thereof of 1200 amperes when the "P" value of the metal of said electrode is up to 2; of 1100 amperes when the "P" value of the metal of said electrode is above 2 and up to 3; of 700 amperes when the "P" value of the metal of said electrode is up above 3 and up to 4; and of 500 amperes when the "P" value of the metal of said electrode is above 4.

2. In a method for arc melting consumable electrodes of a metal selected from the group consisting of Be, Te, Sb, B, Si, W, Fe, Co, Cu, Ni, Mg, Mn, Mo, Sn, Zr, Ti, Cr, Cb, V, Ta, and Al, and alloys formed as combinations of such metals, the improvements which comprise:
(a) employing said metal in the form of a trio of consumable electrodes, and melting said electrodes to form an ingot in an arc furnace evacuated to a pressure below one hundred microns of mercury absolute;
(b) supplying three-phase alternating electric current as melting power with each phase of said current being connected to one of said trio of electrodes;
(c) the equivalent circular diameter of each of said electrodes of said metal being a minimum determined from the equation $$D = 12.13 - 1.93P$$

wherein "D" is the electrode equivalent circular diameter in inches, and "P" is the plasma generating capacity of said metal which for unalloyed metal is the "P" value shown for such metal in Table 1, and "P" for alloys is the average of the values for "P" shown in Table 1 for each constituent metal of said alloy present in significant amounts; and,
(d) the electric current supplied to each of said electrodes being a minimum for each inch of equivalent circular diameter thereof of 1200 amperes when the "P" value of the metal of said electrode is up to 2; of 1100 amperes when the "P" value of the metal of said electrode is above 2 and up to 3; of 700 amperes when the "P" value of the metal of said electrode is up above 3 and up to 4; and of 500 amperes when the "P" value of the metal of said electrode is above 4.

3. In a method for arc melting consumable electrodes of a metal selected from the group consisting of Be, Te, Sb, B, Si, W, Fe, Co, Cu, Ni, Mg, Mn, Mo, Sn, Zr, Ti, Cr, Cb, V, Ta, and Al, and alloys formed as combinations of such metals, the improvements which comprise:
(a) employing said metal in the form of a trio of sector-shaped consumable electrodes, and melting said electrodes to form an ingot in an arc furnace evacuated to a pressure below one millimeter of mercury absolute;
(b) supplying three-phase alternating electric current as melting power with each phase of said current being connected to one of said trio of electrodes;
(c) the equivalent circular diameter of each of said sector-shaped electrodes of said metal being a minimum determined from the equation $$D = 12.13 - 1.93P$$

wherein "D" is the electrode equivalent circular diameter in inches, and "P" is the plasma generating capacity of said metal which for unalloyed metal is the "P" value shown for such metal in Table 1, and "P" for alloys is the average of the values for "P" shown in Table 1 for each constituent metal of said alloy present in significant amounts; and, (d) the electric current supplied to each of said electrodes being a minimum for each inch of equivalent circular diameter thereof of 1200 amperes when the "P" value of the metal of said electrode is up to 2; of 1100 amperes when the "P" value of the metal of said electrode is above 2 and up to 3; of 700 amperes when the "P" value of the metal of said electrode is up above 3 and up to 4; and of 500 amperes when the "P" value of the metal of said electrode is above 4.

4. In a method for arc melting consumable electrodes of a metal selected from the group consisting of Be, Te, Sb, B, Si, W, Fe, Co, Cu, Ni, Mg, Mn, Mo, Sn, Zr, Ti, Cr, Cb, V, Ta, and Al, and alloys formed as combinations of such metals, the improvements which comprise:

(a) employing said metal in the form of a trio of consumable electrodes, and melting said electrodes to form an ingot in an arc furnace evacuated to a pressure below one millimeter of mercury absolute;

(b) supplying three-phase alternating electric current as melting power with each phase of said current being connected to one of said trio of electrodes;

(c) the equivalent circular diameter of each of said electrodes of said metal being a minimum determined from the equation $$D = 12.13 - 1.93P$$

wherein "D" is the electrode equivalent circular diameter in inches, and "P" is the plasma generating capacity of said metal which for unalloyed metal is the "P" value shown for such metal in Table 1, and "P" for alloys is the average of the values for "P" shown in Table 1 for each constituent metal of said alloy present in significant amounts; and, (d) the electric current supplied to each of said electrodes being a minimum of 1200 amperes for each inch of equivalent circular diameter thereof.

5. In a method for arc melting an alloy steel formed as a combination of metals selected from the group consisting of Be, Te, Sb, B, Si, W, Fe, Co, Cu, Ni, Mg, Mn, Mo, Sn, Zr, Ti, Cr, Cb, V, Ta, and Al, and having a plasma generating capacity "P" of over 2 and up to 3, the improvements comprising:

(a) employing said metal in the form of a trio of consumable electrodes and melting said electrodes to form an ingot in an arc furnace evacuated to a pressure below one millimeter of mercury absolute;

(b) supplying three-phase alternating electric current as melting power with each phase of said current being connected to one of said trio of electrodes;

(c) the equivalent circular diameter of each of said electrodes of said metal being a minimum determined from the equation $$D = 12.13 - 1.93P$$

wherein "D" is the electrode equivalent circular diameter in inches, and "P" is the plasma generating capacity of said metal which for unalloyed metal is the "P" value shown for such metal in Table 1, and "P" for alloys is the average of the values for "P" shown in Table 1 for each constituent metal of said alloy present in significant amounts; and, (d) the electric current supplied to each of said electrodes being a minimum of 1100 amperes for each inch of equivalent circular diameter thereof.

6. In a method for arc melting a titanium base alloy formed as a combination of metals selected from the group consisting of Be, Te, Sb, B, Si, W, Fe, Co, Cu, Ni, Mg, Mn, Mo, Sn, Zr, Ti, Cr, Cb, V, Ta, and Al, and having a plasma generating capacity "P" of over 3 and up to 4 the improvements comprising:

(a) employing said metal in the form of a trio of consumable electrodes, and melting said electrodes to form an ingot in an arc furnace evacuated to a pressure below one millimeter of mercury absolute;

(b) supplying three-phase alternating electric current as melting power with each phase of said current being connected to one of said trio of electrodes;

(c) the equivalent circular diameter of each of said electrodes of said metal being a minimum determined from the equation $$D = 12.13 - 1.93P$$

wherein "D" is the electrode equivalent circular diameter in inches, and "P" is the plasma generating capacity of said metal which for unalloyed metal is the "P" value shown for such metal in Table 1, and "P" for alloys is the average of the values for "P" shown in Table 1 for each constituent metal of said alloy present in significant amounts; and, (d) the electric current supplied to each of said electrodes being a minimum of 700 amperes for each inch of equivalent circular diameter thereof.

7. In a method for arc melting a titanium base alloy formed as a combination of metals selected from the group consisting of Be, Te, Sb, B, Si, W, Fe, Co, Cu, Ni, Mg, Mn, Mo, Sn, Zr, Ti, Cr, Cb, V, Ta, and Al, and having a plasma generating capacity "P" of over 4 the improvements comprising:

(a) employing said metal in the form of a trio of consumable electrodes, and melting said electrodes to form an ingot in an arc furnace evacuated to a pressure below one millimeter of mercury absolute;

(b) supplying three-phase alternating electric current as melting power with each phase of said current being connected to one of said trio of electrodes;

(c) the equivalent circular diameter of each of said electrodes of said metal being a minimum determined from the equation $$D = 12.13 - 1.93P$$

wherein "D" is the electrode equivalent circular diameter in inches, and "P" is the plasma generating capacity of said metal which for unalloyed metal is the "P" value shown for such metal in Table 1, and "P" for alloys is the average of the values for "P" shown in Table 1 for each constituent metal of said alloy present in significant amounts; and, (d) the electric current supplied to each of said electrodes being a minimum of 500 amperes for each inch of equivalent circular diameter thereof.

References Cited by the Examiner

UNITED STATES PATENTS

| | | | |
|---|---|---|---|
| 2,189,387 | 2/1940 | Wissler | 13—9 |
| 2,726,278 | 12/1955 | Southern | 13—9 |
| 2,743,307 | 4/1956 | Johnson | 13—31 |
| 2,908,736 | 10/1959 | Ernst | 13—9 |
| 2,922,028 | 1/1960 | Butler et al. | 219—145 |
| 2,933,594 | 4/1960 | Johnson et al. | 219—137 |
| 3,019,274 | 1/1962 | Gruber et al. | 13—31 |
| 3,086,103 | 4/1963 | Hackman et al. | 219—74 |

RICHARD M. WOOD, *Primary Examiner.*

V. Y. MAYEWSKY, *Assistant Examiner.*